(12) United States Patent
Bradshaw

(10) Patent No.: US 6,270,612 B1
(45) Date of Patent: *Aug. 7, 2001

(54) MASTER PROCESSING APPARATUS AND CARTRIDGE THEREFOR

(75) Inventor: Franklin C. Bradshaw, Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/301,563

(22) Filed: Apr. 29, 1999

Related U.S. Application Data

(63) Continuation of application No. 08/989,513, filed on Dec. 12, 1997, now Pat. No. 5,961,779, which is a continuation of application No. 08/748,982, filed on Nov. 14, 1996, now Pat. No. 5,735,998, which is a continuation of application No. 08/354,222, filed on Dec. 12, 1994, now Pat. No. 5,580,417, which is a continuation-in-part of application No. 08/247,003, filed on May 20, 1994, now Pat. No. 5,584,962.

(51) Int. Cl.[7] ........................................ B32B 31/00
(52) U.S. Cl. ................... 156/234; 156/238; 156/495; 156/522; 156/555; 100/176
(58) Field of Search .................... 156/230, 234, 156/238, 247, 249, 250, 269, 510, 522, 540, 541, 542, 555; 100/176

(56) References Cited

U.S. PATENT DOCUMENTS

| | | |
|---|---|---|
| 2,647,299 | 8/1953 | Thomas . |
| 3,027,285 | 3/1962 | Eisner et al. . |
| 3,309,983 | 3/1967 | Dresser . |
| 3,737,359 | 6/1973 | Levitan . |
| 3,799,829 | 3/1974 | Heatwole . |
| 3,901,758 | 8/1975 | Humphries . |
| 3,944,455 | 3/1976 | French . |
| 4,090,911 | 5/1978 | Shaffer . |
| 4,151,900 | 5/1979 | Kirwan . |
| 4,295,921 | 10/1981 | Bopst, III . |
| 4,387,000 | 6/1983 | Tancredi . |
| 4,425,182 | 1/1984 | Jones . |
| 4,564,411 | 1/1986 | Holzer . |
| 4,619,728 | 10/1986 | Brink . |
| 4,625,931 | 12/1986 | Tamura . |
| 5,139,600 | 8/1992 | Singer . |
| 5,163,349 | 11/1992 | Takagi et al. . |
| 5,279,697 | 1/1994 | Peterson et al. . |
| 5,295,753 | 3/1994 | Godo . |
| 5,480,509 | 1/1996 | Matsuo . |
| 5,580,417 | * 12/1996 | Bradshaw ............................ 156/495 |
| 5,584,962 | * 12/1996 | Bradshaw et al. .................. 156/495 |
| 5,735,998 | * 4/1998 | Bradshaw ............................ 156/495 |
| 5,788,796 | * 8/1998 | Look et al. ......................... 156/277 |
| 5,788,806 | * 8/1998 | Bradshaw et al. .................. 156/539 |
| 5,961,779 | * 10/1999 | Bradshaw ............................ 156/495 |

FOREIGN PATENT DOCUMENTS

| | | |
|---|---|---|
| 3030179A1 | 3/1982 | (DE) . |
| 1889956 | 4/1970 | (GB) . |
| 1280015 | 7/1972 | (GB) . |
| 2126389A | 3/1984 | (GB) . |
| 2199010A | 6/1988 | (GB) . |
| 2230250A | 10/1990 | (GB) . |

* cited by examiner

Primary Examiner—James Sells
(74) Attorney, Agent, or Firm—Pillsbury Winthrop LLP

(57) ABSTRACT

A multi-purpose laminating and adhesive transfer apparatus having a frame supporting rotatably engaging nip rollers. A replaceable cartridge is insertable into the frame and has upper and lower feed rolls which may be a laminate, film or paper, or an adhesively coated film or a film having an affinity for adhesive. The upper and lower feed rolls containing the webs of laminating or adhesive transfer material have tensioning caps which can be adjusted to provide the proper tensioning to prevent the rollers from overrunning as they rotate. Tensioning caps and the cartridges are pre-set and provided to the user. A cutter blade is positioned at the discharge side of the nip rollers and may be actuated to sever the master at any desired location. The apparatus may be operated to apply lamination to either top or bottom surfaces of a substrate or an adhesive to the top or bottom surface of the substrate or to both surfaces.

129 Claims, 3 Drawing Sheets

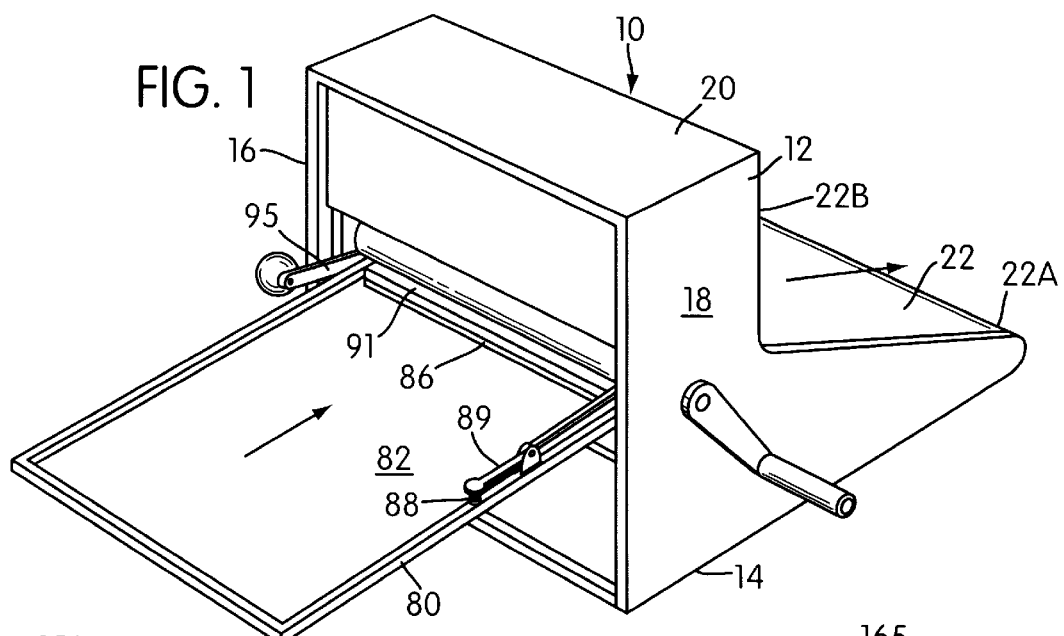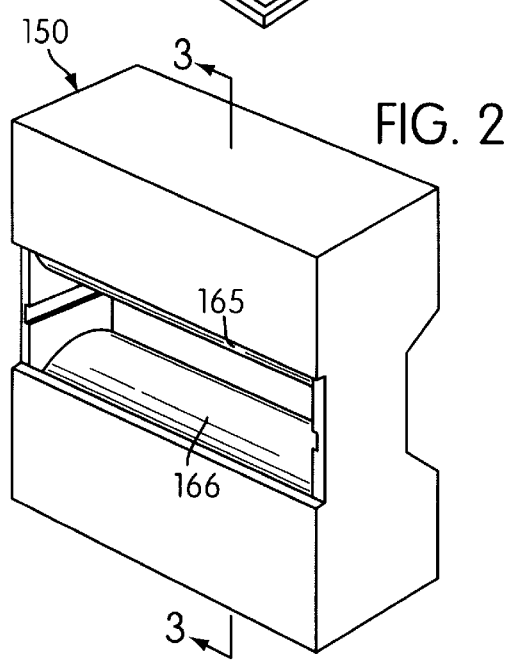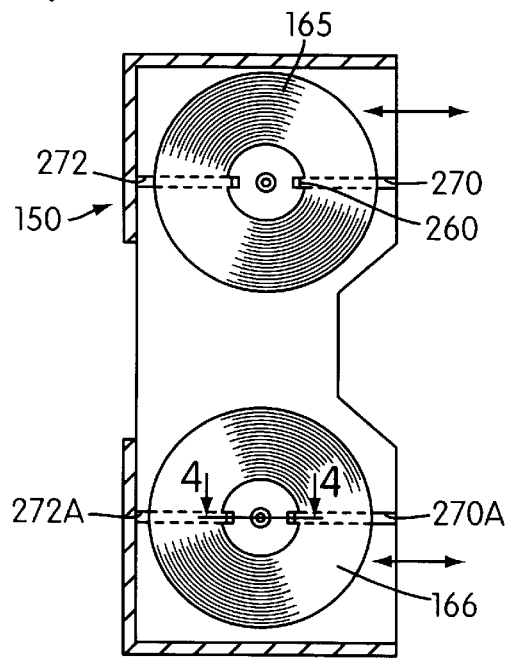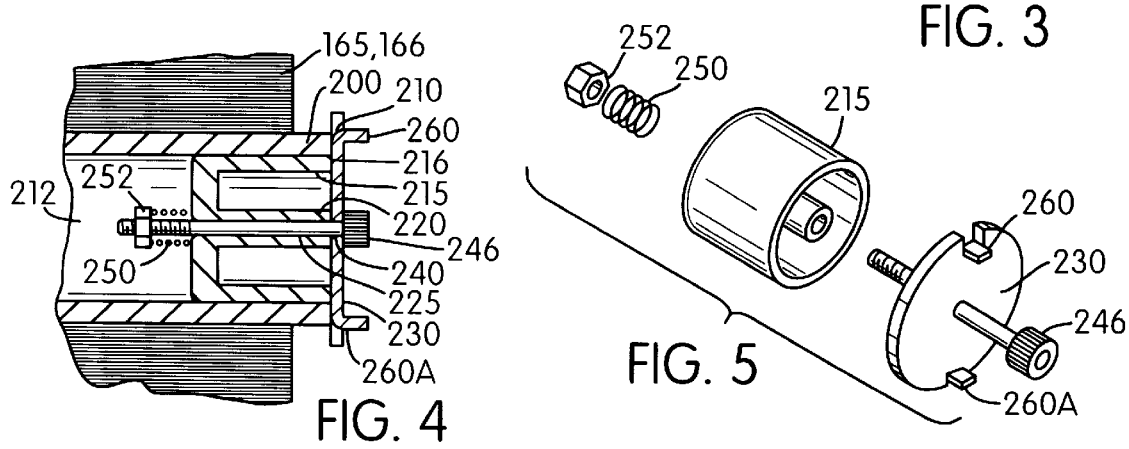

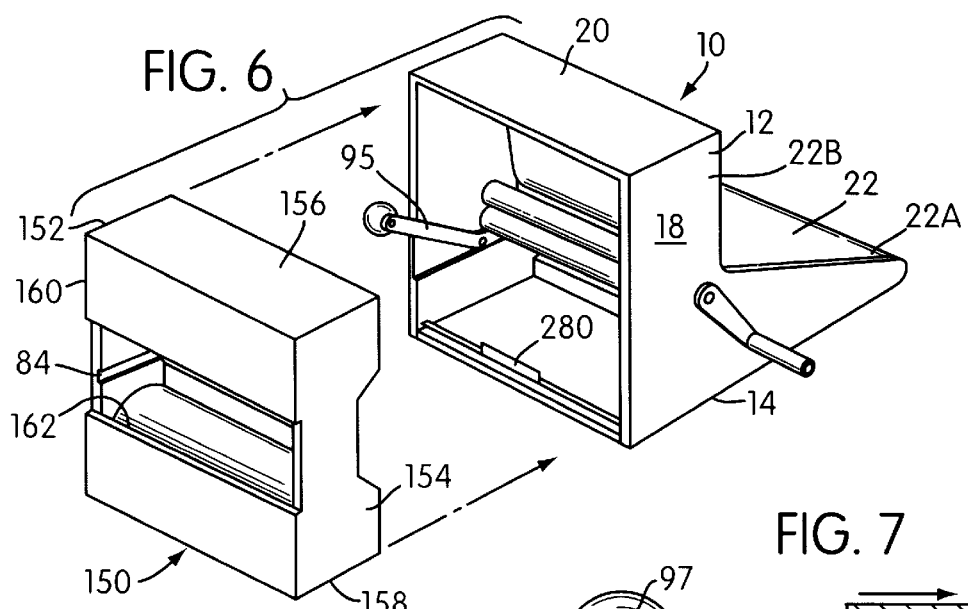
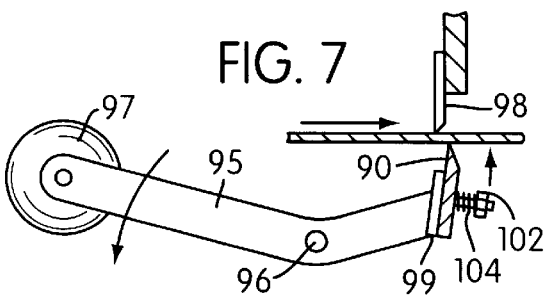
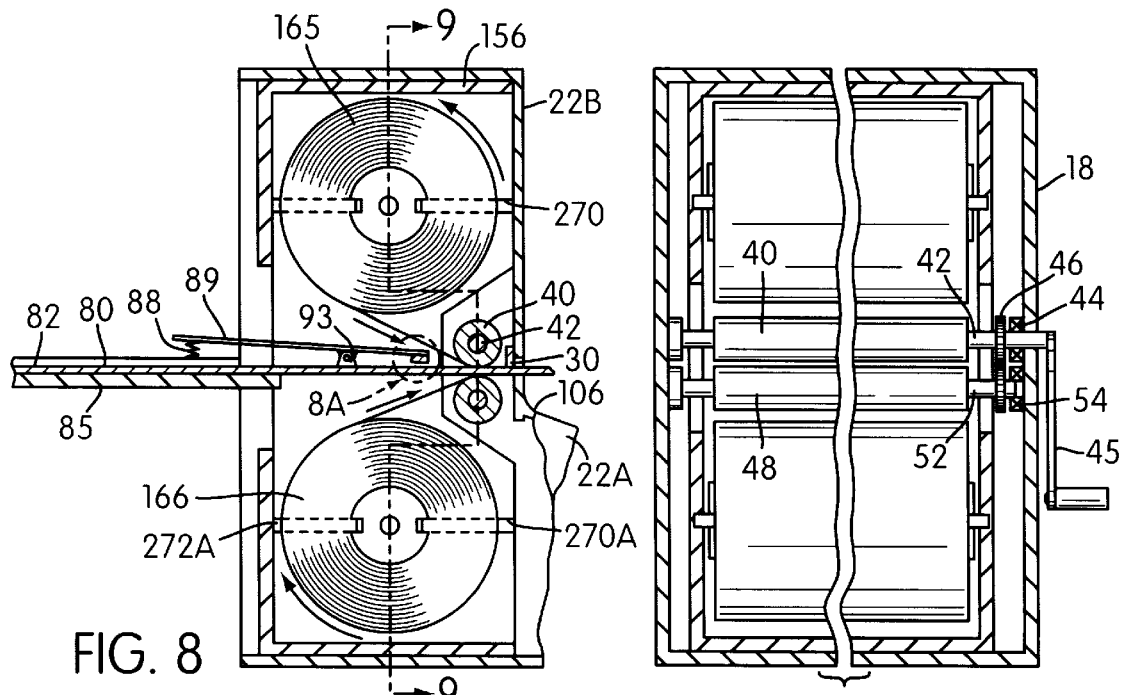
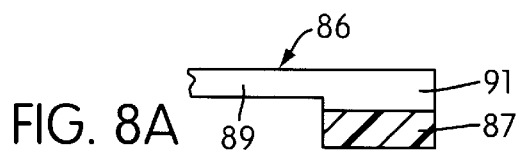

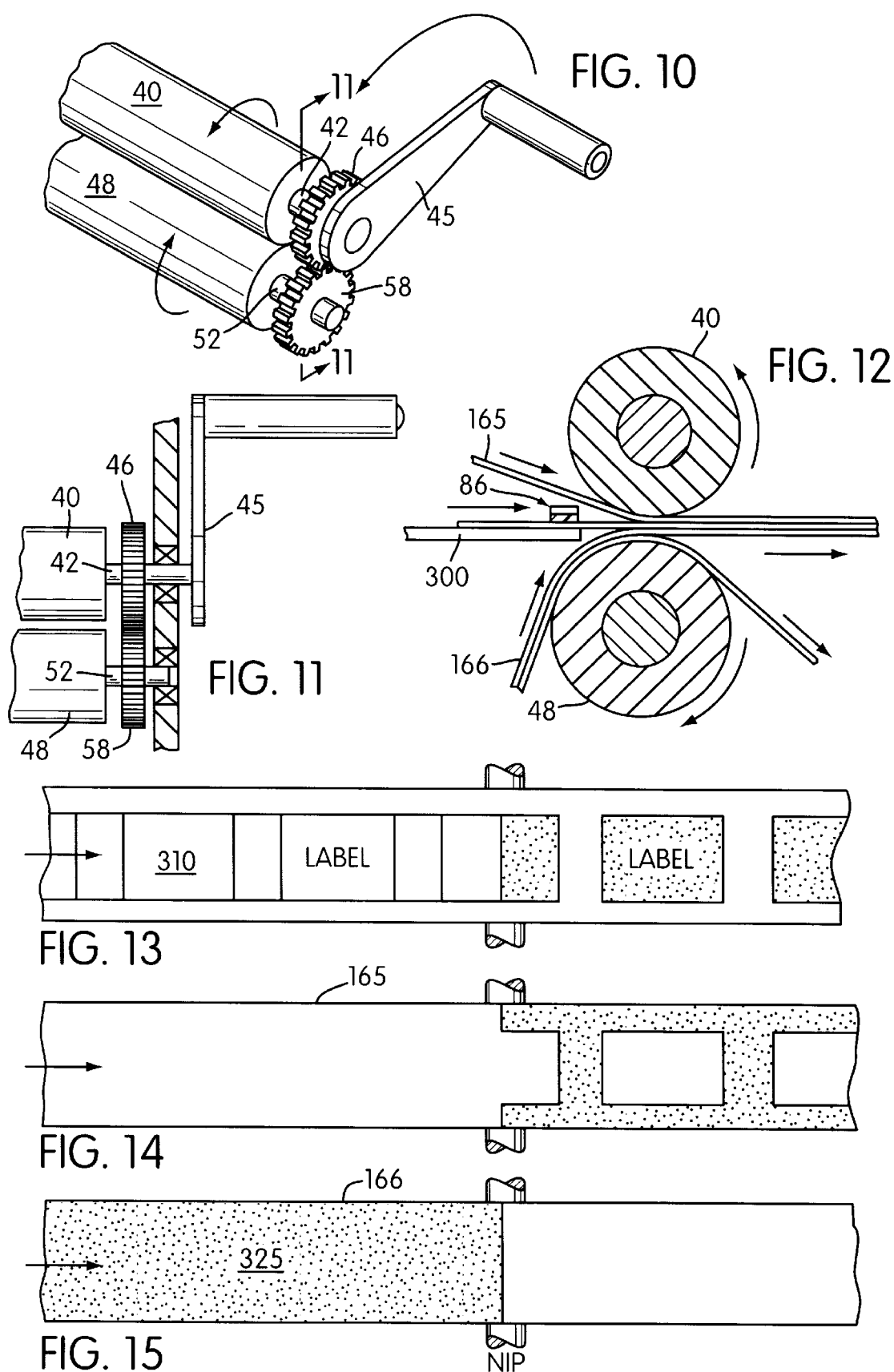

MASTER PROCESSING APPARATUS AND CARTRIDGE THEREFOR

The present application claims priority from and is a continuation application of U.S. Patent Appln. of Bradshaw, Ser. No. 08/989,513, filed Dec. 12, 1997, now U.S. Pat. No. 5,961,779 which is a continuation of and claims priority from U.S. Appln. of Bradshaw, Ser. No. 08/748,982 filed Nov. 14, 1996 (now U.S. Pat. No. 5,735,998), which is a continuation of and claims priority from U.S. Appln. of Bradshaw, Ser. No. 08/354,222 filed Dec. 12, 1994 (now U.S. Pat. No. 5,580,417), which is a continuation-in-part of and claims priority from U.S. Appln. of Bradshaw et al., Ser. No. 08/247,003 filed May 20, 1994 (now U.S. Pat. No. 5,584,962).

FIELD OF THE INVENTION

The present invention relates to an apparatus for laminating items and which apparatus will also tranfer adhesives to substrates for purposed of producing articles such as labels and stickers. The present invention is a continuation-in-part of application Ser. No. 08/247,003, filed May 20, 1994, entitled "Laminating and Ashesive Transfer Apparatus".

BACKGROUND OF THE INVENTION

It is common practice to protect documents and other items such as cards by encasing them in clear plastic coverings. Various products known as protectors are available for this purpose. Another common way of protecting documents and similar items is to laminate them. Lamination involvess sealing the document or item between oppositely applied transparent films and lamination is commonly applied to such items as driver's licenses, identification cards, membership cards and the like.

Another operation that is often applied to documents and papers is that of adhesive transfer. Adhesive transfer is an operation that is used to make articles such as labels and stickers. One manner of producing such labels is to print the labels on blanks provided for this purpose. The blanks generally have an adhesive backing and are secured to a liner from which they may be peeled at the time of use. Computer systems are available that have the capability of printing labels on liner label stock provided for this purpose. This manner of making labels or stickers is expensive and further is limiting in that the printed material must be adapted to the physical size or confines of the label or sticker carried on the liner This limits the information and creativity that may be incorporated in label making.

Based on the foregoing, there exists a need for a simple multi-purpose apparatus which can both serve to apply laminates to documents and papers and which will also serve to apply adhesive, including dry adhesives, to materials of various sizes so a wide variety of labels and stickers may be produced. The apparatus of the present invention can apply clear plastic laminates to maser substrates of various sizes and can also transfer adhesive to substrates of various sizes not being limited by length. Adhesive transfer can be applied to either surface of the item as required. The apparatus can also apply dry adhesives from double sided release coated liners to a substrate.

SUMMARY OF THE INVENTION

To meet this need, the present invention provides an apparatus for processing a master. The apparatus comprises a frame and a removable cartridge removably mounted to the frame. The removable cartridge comprises a cartridge body structure and first and second feed rolls carrying respective supplies of first and second stock material. The feed rolls are mounted to the cartridge body structure to enable the stock materials to be unwound from their respective feed rolls. At least one of the stock materials has a layer of adhesive disposed thereon. A master processing assembly is positioned such that the master can be fed into the processing assembly with the first and second stock materials being unwound from their respective feed rolls and disposed on opposing sides of the master. The master processing assembly is constructed and arranged to perform a master processing operation wherein the processing assembly causes adhesive bonding between the first and second stock materials and the master being fed therein and then subsequently discharges the processed master and stock materials. The cartridge body structure is configured such that the user can remove the removable cartridge from the frame to enable replacement of the removable cartridge when desired. The present invention contemplates numerous variations on this broad concept. For example, the apparatus can be designed for lamination, adhesive transfer, or a combination of both.

BRIEF DESCRIPTION OF THE DRAWINGS

The above and other objects, advantages and features of the present invention will be more fully understood from the following description, claims and drawings in which:

FIG. 1 is a perspective view of the transfer apparatus of the present invention;

FIG. 2 is a perspective view of the supply roll containing a cartridge removed from the apparatus;

FIG. 3 is a sectional view taken along line 3—3 of FIG. 2;

FIG. 4 is a sectional view taken along line 4—4 of FIG. 3;

FIG. 5 is an exploded view of the tensioning cap associated with the supply rolls;

FIG. 6 is a perspective view illustrating the installation of a cartridge;

FIG. 7 is a detail view of the cutter mechanism;

FIG. 8 is a side view, partly in section, showing the cartridge in place and a master being fed into the device;

FIG. 8A is a detail view of the wiper as indicated in FIG. 8;

FIG. 9 is a sectional view taken along line 9—9 of FIG. 8:

FIG. 10 is a detail view of the nip rollers;

FIG. 11 is a sectional view taken along line 11—11 of FIG. 10;

FIG. 12 is a side view showing a master being fed between the nip rollers;

FIG. 13 shows labels as they receive adhesive:

FIG. 14 is a plan view of the upper feed web showing the pick up of excessive adhesive thereon; and FIG. 15 illustrates removal of the adhesive from the lower web.

Turning now to the drawings, particularly FIGS. 1 to 11, the transfer apparatus of the present invention is generally designated by the numeral 10 and includes a housing member generally designated by the numeral 12 having a base 14, opposite side walls 16 and 18, a top 20 and a rear wall 22. Tile rear wall 22 of the housing is upwardly and forwardly inclined at panel 22A from the base 14 to a location where the rear wall extends vertically at panel 22B. As seen in FIG. 8, an opening 30 is defined between the panels 22A and 22B through which the substrate and processed articles are discharged.

As best seen in FIGS. 8, 9 and 10, an upper nip roller 40 extends transversely between the side walls of the frame spaced rearwardly from the edge of the side walls. The upper nip roller includes an axial shaft 42 rotatable in suitable bearings or bushings 44 at opposite ends. The shaft is covered by a cylindrical roller member 43 of resilient material such as rubber. Shaft 42 extends exteriorly of the side plate and is shown carrying a hand crank 45 for manually rotating the roller and shaft. Alternatively, the rollers may be powered by an electrical motor, not shown. A pinion gear 46 is secured to one end of the shaft adjacent the interior surfaces of the side wall.

A second nip roller 48 extends transversely between the side walls 16 and 18 positioned parallel to the upper nip roller. The lower nip roller may be vertically aligned with the upper nip roller but preferably is forwardly displaced a distance forward of the upper nip roller, as for example approximately ¼ as best seen in FIG. 8. The terms "forward" and "rearward" "front" and "rear" as used herein, refer to the orientation of the feed path through the dive. The lower nip roller has shaft 52 which is rotatable in bearings 54 located at the interior of the opposite side walls. A pinion gear 58 is mounted at one end of the shaft 52. Pinion gear 58 engages the pinion gear 46 on the upper nip shaft so that actuation of the upper nip roller by means of the crank 45 or other power means will impart opposite rotation to both nip rollers as indicated by the arrows in FIG. 10.

Feed tray 80 has of a planar feeding surface 82 with opposite extending flanges 85 which flanges are removably insertable in horizontal recesses 84 of the cartridge 100. A wiper assembly 86 is mounted on the upper surface of the feed tray as seen in FIGS. 8 and 8A. The wiper has a bar 91 which extends transversely across the tray adjacent the entrance to the nip area. The bar has a pad 87 of felt or resilient or soft material such as felt, soft plastics, fabric or rubber, which lightly engaged the master as it passes between the wiper and the tray surface. The wiper serves several functions and cleans, smooths and guides the master as it enters the nip between the rollers. A particularly important function of the wiper is to tension the master substrate keeping it flat and aligned with the laminate and adhesive webs resulting in better alignment especially when feeding sheets intermittently. The wiper has an arm 89 which is upwardly biased by spring 88. Arm 89 is pivotally attached to the edge of the tray at fulcrum 93 so that the wiper is pressed into light engagement with the material passing beneath the pad 87. The wiper bar 91 may be lifted to facilitate loading a master by manually depressing the outer end of the arm 89 against the force of spring 88. Preferably the pad is replaceable as required.

Referring to FIGS. 6 and 7, a blade 90 having a cutting edge extends transversely adjacent the discharge opening. The blade is movable vertically upward from a non-actuated position to a cutting position by means of lever 95 to which the bar 90 is attached. Lever 95 is pivotally secured to the interior of the housing side wall at pivot rod 96. Downward movement of the lever at handle 97 will move the blade 90 upward into engagement with anvil bar 98 which is fixed and extends transversely. Preferably, the blade 90 is mounted on a carrier 99 by means of pins 102 having compression springs 104 thereon which bias the blade award the cutting bar. Thus, when the cutting action occurs, the flat surface of the blade moves along the anvil which provides a self-clearing action. The upper end of panel 22A is slightly curved at 106 as seen in FIG. 8 to facilitate smooth discharge of the item being processed. The area indicated by the numeral 106 may be coated with a suitable low-frictional material such as that sold under the trademark "Teflon".

A primary advantage of the present invention is that various substrates may be provided to the user in a self-contained, ready-to-use cartridge which allows the user simply to select and insert the appropriate cartridge. As indicated above, the device of the present invention can be used for multiple purposes for adhesive transfer and lamination. Adhesive can be transferred to either surface of the master and may be a dry adhesive. The cartridge is generally designated by the numeral 150 and includes a frame having opposite side walls 152, 154, a top 156, and bottom 158. A front wall 160 defines a substantial rectangular opening 162. As shown, the cartridge includes an upper feed roll 165 and a lower feed roll 166 each containing a web of film or other flexible substrate material. A significant advantage of the present invention is that the upper and lower feed rolls are provided Lo the user pre-wound and properly tensioned so as not to overrun during operation and to provide proper tracking. The proper tensioning of the feed rolls is accomplished by means of a tensioning device as best seen in FIGS. 3, 4 and 5.

In FIGS. 3, 4 and 5, which figures are representative of the construction of the both ends of both feed rolls, the substrate material is shown wound about the feed roll core 200. The core 200 is a cylinder of cardboard or plastic having an end face 210. Core 200 has a hollow interior 212 which receives an end cap 215. The cap may be molded of plastic or other similar material having an interior outer wall 216. A boss 220 is concentrically formed in the cap with respect to the cylinder wall 216. Boss 220 defines an axial bore 225. The cap 215 is positioned slightly inwardly of the end of the core and may be adhesively secured to the interior wall 212 of the roll core 200.

A circular end plate 230 abuts the end of the core which plate has a diameter slightly greater than the diameter of the core. The end plate has a central aperture 240 which receives the threaded shaft of bolt 246. A spring 250 is interposed between the head of the bolt and the interior face of the cap 215. Nut 252 engages the threaded end of the bolt. The head of the bolt 246 bears against the exposed surface of the end plate 230 and the position of the nut along the shaft of the bolt determines the frictional resistance that exists between the interior surface of the end plate 230 and the end face of the core of the roller. This tension is pre-adjusted by the manufacturer to provide the proper roll tension depending upon the type of material on the roll, the size of the material, the thickness of the material and other factors. Mounting tabs 260 and 260A project outwardly from the end plate and are slidingly engageable in mounting slots 270, 270A and 272, 272A provided on the interior surfaces of the cartridge side walls.

Thus, it Mill be seen that inserting a supply of suitable feed substrate is easily accomplished. The user simply selects the appropriate cartridge 150 and positions the cartridge in the opening at the front side of the housing. The cartridge is locked in place in the housing in a vertical position by locking detent members 280. The feed rolls may be various types of stock such as clear laminates. paper or film for removing excessive adhesive or rolls of material having a loose adhesive coating and a release coating on the opposite surface. The feed tray 80 is inserted in a generally horizontal position in the opposite slots in the cartridge As mentioned above, the device may be used as a lamination device or as an adhesive transfer device. In the case of use as an adhesive transfer device, the lower feed roll which consists of a film carrying an easily transferable adhesive. The upper feed roll would typically be a web of flexible carrier material having release characteristics on a lower surface and adhesive coating on the other surface. With rolls of this type in position, the end of the web of the lower feed roll is extended over the lower nip roller. The upper feed roll, in the case of adhesive transfer, will consist of a web of material such as inexpensive paper or film, having an affinity or adhesive. The end of the web is extended between the nip rollers with the end of the web adhesively secured to the web of the master in the lower roll.

Referring to FIGS. 11 to 15, the master which is designated by the numeral 300 consists of a continuous sheet of material having an upper surface and a lower surface. The upper surface carries labels 310 which have been pre-printed. Obviously, the master can be any pre-printed document or series of documents which can be generated by he user, as for example on a computer. The labels 310 can be of varying size and shape and it is understood that the term "labels" as used herein is intended to be representative of printed materials of various types arranged on a flexible substrate.

The master is aligned on the feed tray with the leading free edge of the master positioned on the exposed adhesive surface of the lower feed stock material 166 at the nip roller interface. The slight forward protrusion of the lower nip roller 48 facilitates securing the master at this location. The web 165 of the upper feed roller is fed from the cartridge to the nip roller interface on the upper side of master 300.

The operator then actuates the machine by operating the crank which will rotate the upper nip roller and by mean s of the inter-engaging pinion Fears, cause rotation of the lower nip roller. The rotation will also advance the upper web, the lower web and the master. The master is smoothed, guided and wiped clean as it passes between the wiper 86 and the upper surface of the tray. As the master proceeds between the nip rollers in the interface nip area, the exposed adhesive 325 from the lower web will be transferred to the lower surface of the master 300. The upper web 165 will pick up any excessive adhesive not transferred to the master, as for example adhesive in the areas outside the perimeter of the label areas 310. The upper web should be wider than the adhesive web The master may then be easily severed into individual labels or strips of labels by operating the cutter by means of the lever as the master emerges from the discharge opening at the rear of the machine.

Note that the master can be oriented with either printing or indicia facing upwardly or downwardly depending on the user's requirements.

For example, if the user is making labels which are to be applied to the inside of a window, the master would, in most cases, be fed into the applicator with the printing disposed downwardly so adhesive would be applied over the printed area 310. The apparatus can apply lamination to either top or bottom surfaces of a substrate or adhesive to the top or bottom surfaces of a substrate or to both surfaces. The device can also perform combination operations in applying of both the laminate and an adhesive to a substrate, the operation being determined by the selection of the cartridge and feed rolls within the cartridge that are inserted into the apparatus.

The characteristics of the lower web are such that the adhesive is a nonaggressive adhesive loosely adhered 70 the surface of the web. Thus, the lower web serves as a peelable cover which can be stripped away at the time the master is to be used by adhesively applying the master to a surface.

One significant advantage of the present invention is that the upper and lower feed rolls may be provided to the user pre-wound and properly tensioned so as not to overrun during operation. The proper tensioning is pre-set by the tensioning device described above.

While the principles of the invention have been made clear in the illustrative embodiments set forth above, it will be obvious to those skilled in the art to make various modifications to the structure, arrangement, proportion, elements, materials and components used in the practice of the invention. To the extent these various modifications do not depart from the spirit and scope of the appended claims, they are intended to be encompassed therein.

I claim:

1. A method for performing a laminating operation wherein a master is laminated, said method comprising:
    providing a removable cartridge comprising;
        (i) a cartridge body structure, and
        (ii) first and second feed rolls each carrying a supply of laminating material and being mounted to said cartridge body structure to enable the laminating materials to be unwound from their respective feed rolls, at least one of said laminating materials having a layer of adhesive disposed thereon;
    removably mounting said cartridge to an apparatus comprising a frame, and actuator, and a laminating assembly;
    then inserting the master into said laminating assembly with said laminating materials being unwound from their respective feed rolls and disposed on opposing sides of said master; and
    thereafter operating said actuator so as to cause said laminating assembly to perform a laminating operation said laminating materials and said master are adhesively bonded together and then the laminated master is discharged from the apparatus.

2. A method according to claim 1, wherein each of said laminating materials has a layer of pressure-sensitive adhesive disposed thereon and wherein said laminating assembly has first and second cooperating structures constructed and arranged to apply pressure to said master and said laminating materials so as to cause said adhesive bonding as a result of operation of said actuator.

3. A method according to claim 2, wherein said first and second cooperating structures are first and second nip rollers rotatably mounted to said frame.

4. A method according to claim 3, wherein said actuator is a rotatable crank handle operatively connected to said nip rollers and wherein manually rotating said crank handle manually affects rotation of said nip rollers.

5. A method according to claim 4, wherein said adhesive layers on said laminating materials are formed from pressure-sensitive adhesives and wherein said laminating operation is performed by pressure being applied to said laminating materials and said master without the use of heat transfer as a result of operating said actuator.

6. An apparatus for processing a master, said apparatus comprising:
    a frame;
    a removable cartridge removably mounted to said frame, said removable cartridge comprising a cartridge body structure and first and second feed rolls carrying respective supplies of first and second stock material, said feed rolls being mounted to said cartridge body structure to enable the stock materials to be unwound from their respective feed rolls, at least one of said stock materials having a layer of adhesive disposed thereon;

a master processing assembly positioned with respect to said first and second feed rolls such that the master can be fed into said processing assembly with said first and second stock materials being unwound from their respective feed rolls and disposed on opposing sides of the master;

said master processing assembly being constructed and arranged to perform a master processing operation wherein said processing assembly causes adhesive bonding between the first and second stock materials and the master being fed therein and then subsequently discharges the processed master and stock materials; and an actuator constructed and arranged to affect operation of said master processing assembly so as to perform said master processing operation;

said cartridge body structure being configured such that the user can remove said removable cartridge from said frame to enable replacement of said removable cartridge when desired.

7. An apparatus according to claim 6, wherein said cartridge body structure has a master feeding opening which is positioned and configured to allow the master to be inserted through said opening between said feed rolls with said first and second stock materials being unwound from their respective feed rolls and disposed on the opposing sides of the master and then into said processing assembly for performance of said master processing operation.

8. An apparatus according to claim 6, wherein adhesive layer is formed from pressure-sensitive adhesive and wherein said master processing assembly is constructed and arranged to perform the master processing operation without the use of heat transfer by applying pressure to said stock materials and the master fed therein.

9. An apparatus according to claim 6, wherein said adhesive layer is formed from pressure-sensitive adhesive and wherein said master processing assembly includes first and second cooperating structures which are constructed and arranged to apply pressure to the master and stock materials fed therein so as to cause said adhesive bonding and perform said master processing operation without the use of heat transfer.

10. An apparatus according to claim 9, wherein said first and second cooperating structures are first and second nip rollers constructed and arranged to apply pressure to said stock materials as a result of said actuator being operated.

11. An apparatus according to claim 10, wherein said first and second nip rollers are rotatably mounted to said frame.

12. An apparatus according to claim 6, wherein both said first and second stock materials are transparent laminating substrates with layers of adhesive disposed on each.

13. An apparatus according to claim 12, wherein said layers of adhesive disposed on said laminating substrates are formed from pressure-sensitive adhesive.

14. An apparatus according to claim 8, wherein said first stock material is a release liner with a layer of pressure-sensitive adhesive disposed thereon and wherein said second stock material is a substrate having an affinity for bonding with said pressure-sensitive adhesive.

15. An apparatus according to claim 7, further comprising a feed tray mounted to said frame, said feed tray being constructed and arranged to support and guide the master as it is being inserted through said master feeding opening.

16. An apparatus according to claim 6, further comprising a blade constructed and arranged to sever the processed master and stock materials.

17. An apparatus according to claim 16, wherein said blade is constructed and arranged to sever the processed master and stock materials transversely with respect to the direction in which they are fed.

18. An apparatus for processing a master in conjunction with a removable cartridge comprising a cartridge body structure and first and second feed rolls carrying respective supplies of first and second stock material, said first and second feed rolls being mounted to said cartridge body structure to enable the stock materials to be unwound from their respective feed rolls, at least one of the stock materials having a layer of adhesive disposed thereon, said apparatus comprising:

a frame constructed and arranged such that the removable cartridge can be removably mounted thereto;

a master processing assembly positioned with respect to said frame such that, when the removable cartridge is removably mounted to said frame, the master can be fed into said master processing assembly with said first and second stock materials unwound from their respective feed rolls and disposed on opposing sides of the master;

said master processing assembly being constructed and arranged to perform a master processing operation wherein said processing assembly causes adhesive bonding between the first and second stock materials and the master being fed into said processing assembly and then subsequently discharges the processed master and stock materials; and an actuator constructed and arranged to affect operation of said master processing assembly so as to perform said master processing operation.

19. An apparatus according to claim 18, wherein said master processing assembly is constructed and arranged to perform the master processing operation without the use of heat transfer by applying pressure to said stock materials and the master fed therein.

20. An apparatus according to claim 18, wherein said master processing assembly includes first and second cooperating structures which are constructed and arranged to apply pressure to the master and stock materials fed therein so as to cause said adhesive bonding and perform said master processing operation without the use of heat transfer.

21. An apparatus according to claim 20, wherein said first and second cooperating structures are first and second nip rollers constructed and arranged to apply pressure to said stock materials as a result of said actuator being operated.

22. An apparatus according to claim 18, further comprising a feed tray mounted to said frame, said feed tray being constructed and arranged to support and guide the master as it is being fed towards said processing assembly.

23. An apparatus according to claim 18, further comprising a blade constructed and arranged to sever the processed master and stock materials.

24. An apparatus according to claim 23, wherein said blade is constructed and arranged to sever the processed master and stock materials transversely with respect to the direction in which they are fed.

25. A removable cartridge to be used in conjunction with a master processing apparatus for processing a master, the apparatus comprising a frame, a master processing assembly constructed and arranged to perform a master processing operation wherein said processing assembly causes adhesive bonding between substrates fed therein, and an actuator constructed and arranged to affect operation of the master processing assembly, said cartridge comprising:

a cartridge body structure constructed and arranged to be removably mounted to the apparatus frame;

first and second feed rolls each carrying supplies of first and second stock materials and being mounted to said cartridge body structure to enable the stock materials to be unwound from their respective feed rolls, at least one of said stock materials having a layer of adhesive disposed thereon;

said cartridge body structure and said first and second feed rolls being constructed and arranged such that, when said cartridge body structure is removably mounted to the apparatus frame, the master can be inserted into the master processing assembly of the apparatus with said first and second stock materials being unwound from their respective feed rolls and disposed on opposing sides of the master, thereby enabling the actuator to be operated to cause the processing assembly to perform the aforesaid master processing operation wherein said processing assembly causes adhesive bonding between said first and second stock materials and the master being fed therein and then subsequently discharges the processed master and stock materials;

said cartridge body structure being constructed and arranged such that, when said cartridge is removably mounted to the frame of the apparatus, said cartridge can be removed from the apparatus frame to enable cartridge replacement when desired.

26. A removable cartridge according to claim 25, wherein said cartridge body structure has a master feeding opening which is positioned and configured with respect to said feed rolls such that the master is inserted through said opening and between said feed rolls before being inserted into the master processing assembly.

27. A removable cartridge according to claim 25, wherein both said first and second stock materials are transparent laminating substrates with layers of adhesive disposed on each.

28. A removable cartridge according to claim 27, wherein said layers of adhesive disposed on said stock materials are pressure-sensitive.

29. A removable cartridge according to claim 25, wherein said first stock material is a release liner with a layer of pressure-sensitive adhesive disposed thereon and wherein said second stock material is a substrate having an affinity for bonding with said pressure-sensitive adhesive.

30. A removable cartridge according to claim 25, wherein said cartridge comprises a pair of side walls and a rear wall extending between said side walls, said master feeding opening being formed through said rear wall.

31. A laminating and adhesive transfer apparatus for performing a laminating or adhesive transfer operation on a master, said apparatus comprising:

a frame;

a removable cartridge removably mounted to said frame, said removable cartridge comprising a cartridge body structure and first and second feed rolls carrying respective supplies of first and second stock material, said feed rolls being mounted to said cartridge body structure to enable the stock materials to be unwound from their respective feed rolls, at least one of said stock materials having a layer of adhesive disposed thereon;

a master processing assembly positioned with respect to said first and second feed rolls such that the master can be fed into said processing, assembly with said first and second stock materials being unwound from their respective feed rolls and disposed on opposing sides of the master;

said master processing assembly being constructed and arranged to perform a laminating or adhesive transfer operation wherein said processing assembly causes adhesive bonding between the first and second stock materials and the master being fed therein and then subsequently discharges the processed master and stock materials; and an actuator constructed and arranged to affect operation of said master processing assembly so as to perform said laminating or adhesive transfer operation;

said cartridge body structure being configured such that the user can remove said removable cartridge from said frame and to enable replacement of said removable cartridge when desired.

32. An apparatus according to claim 31, wherein said cartridge body structure has a master feeding opening which is positioned and configured to allow the master to be inserted through said opening between said feed rolls with said first and second stock materials being unwound from their respective feed rolls and disposed on the opposing sides of the master and then into said processing assembly for performance of said laminating or adhesive transfer operation.

33. An apparatus according to claim 31, wherein said adhesive layer is formed from a pressure-sensitive adhesive and wherein said master processing assembly includes first and second cooperating structures which are constructed and arranged to apply pressure to the master and stock materials fed therein so as to cause said adhesive bonding and perform said laminating or adhesive transfer operation without the use of heat transfer.

34. An apparatus according to claim 33, wherein said first and second cooperating structures are first and second nip rollers constructed and arranged to apply pressure to said stock materials as a result of said actuator being operated.

35. An apparatus according to claim 34, wherein said first and second nip rollers are rotatably mounted to said frame.

36. An apparatus according to claim 31, wherein both said first and second stock materials are transparent laminating substrates with layers of adhesive disposed on each.

37. An apparatus according to claim 36, wherein said layers of adhesive disposed on said laminating materials are both formed from pressuresensitive adhesive.

38. An apparatus according to claim 31, wherein said first stock material is a release liner with a layer of pressure-sensitive adhesive disposed thereon and wherein said second stock material is a substrate having an affinity for bonding with said pressure-sensitive adhesive.

39. An apparatus according to claim 32, further comprising a feed tray mounted to said frame, said feed tray being constructed and arranged to support and guide the master as it is being inserted through said master feeding opening.

40. An apparatus according to claim 39, further comprising a blade constructed and arranged to sever the processed master and stock materials.

41. An apparatus according to claim 40, wherein said blade is constructed and arranged to sever the processed master and stock materials transversely with respect to the direction in which they are fed.

42. An apparatus according to claim 31, wherein said layer is formed from a pressure-sensitive adhesive and wherein said master processing assembly is constructed and arranged to perform the laminating or adhesive transfer operation without the use of heat transfer by applying pressure to said stock materials and the master fed therein.

43. A laminating and adhesive transfer apparatus for performing a laminating or adhesive transfer operation on a master in conjunction with a removable cartridge comprising a cartridge body structure and first and second feed rolls carrying respective supplies of first and second stock material, the feed rolls being mounted to said cartridge body structure to enable the stock materials to be unwound from their respective feed rolls, at least one of the stock materials having a layer of adhesive disposed thereon, said apparatus comprising:

a frame constructed and arranged such that the removable cartridge can be removably mounted thereto;

a master processing assembly positioned with respect to said frame such that, when the removable cartridge is removably mounted to said frame, the master can be fed into said master processing assembly with said first and second stock materials being unwound from said feed rolls and disposed on the opposing sides of the master;

said master processing assembly being constructed and arranged to perform a laminating or adhesive transfer operation wherein said processing assembly causes adhesive bonding between the first and second stock materials and the master being fed into said processing assembly and then subsequently discharges the processed master and stock materials; and an actuator constructed and aligned to affect operation of said cooperating structures so as to perform said laminating or adhesive transfer operation.

44. An apparatus according to claim 43, wherein said adhesive layer is formed from a pressure-sensitive adhesive and wherein said master processing assembly includes first and second cooperating structures which are constructed and arranged to apply pressure to the master and stock materials fed therein so as to cause said adhesive bonding and perform said laminating or adhesive transfer operation without the use of heat transfer.

45. An apparatus according to claim 44, wherein said first and second cooperating structures are first and second nip rollers constructed and arranged to apply pressure to said stock materials as a result of said actuator being operated.

46. An apparatus according to claim 43, further comprising a feed tray mounted to said frame, said feed tray being disposed adjacent the feed side of said cooperating structures and being constructed and arranged to support and guide the master as it is being fed towards said master processing assembly.

47. An apparatus according to claim 43, further comprising a blade constructed and arranged to sever the processed master and stock materials.

48. An apparatus according to claim 47, wherein said blade is located adjacent the discharge side of said cooperating structures and constructed and arranged to sever the processed master and stock materials transversely.

49. A removable cartridge to be used in conjunction with a laminating and adhesive transfer apparatus for performing a laminating or adhesive transfer operation on a master, the apparatus comprising a frame, a master processing assembly constructed and arranged to perform a laminating or adhesive transfer operation wherein said processing assembly causes adhesive bonding between substrates fed therein, and an actuator constructed and arranged to affect operation of the master processing assembly, said cartridge comprising:

a cartridge body structure constructed and arranged to be removably mounted to the apparatus frame;

first and second feed rolls each carrying supplies of first and second stock materials and being mounted to said cartridge body structure to enable the stock materials to be unwound from their respective feed rolls, at least one of said stock materials having a layer of adhesive disposed thereon;

said cartridge body structure and said first and second feed rolls being constructed and arranged such that, when said cartridge body structure is removably mounted to the apparatus frame, the master can be inserted into the master processing assembly of the apparatus with said stock materials being unwound from their respective feed rolls and disposed on opposing sides of the master, thereby enabling the actuator to be operated to cause the processing assembly to perform the aforesaid laminating or adhesive transfer operation wherein the processing assembly causes adhesive bonding between said first and second stock materials and the master being fed therein and then subsequently discharges the processed master and stock materials;

said cartridge body structure being constructed and arranged such that, when said cartridge is removably mounted to the frame of the apparatus, said cartridge can be removed from the apparatus frame to enable cartridge replacement when desired.

50. A removable cartridge according to claim 49, wherein said cartridge body structure has a master feeding opening which is positioned and configured with respect to said feed rolls such that the master is inserted through said opening before being inserted into the master processing assembly.

51. A removable cartridge according to claim 49, wherein both said first and second stock materials are transparent laminating substrates with layers of adhesive disposed on each.

52. A removable cartridge according to claim 51, wherein the layers of adhesive on both said laminating materials are formed from a pressure-sensitive adhesive.

53. An removable cartridge according to claim 49, wherein said first stock material is a release liner with a layer of pressure-sensitive adhesive disposed thereon and wherein said second stock material is a substrate having an affinity for bonding with said pressure-sensitive adhesive.

54. A removable cartridge according to claim 49, wherein said adhesive layer is formed from a pressure-sensitive adhesive.

55. A laminating apparatus for performing a laminating operation on a master, said apparatus comprising:

a frame;

a removable cartridge removably mounted to said frame, said removable cartridge comprising a cartridge body structure and first and second feed rolls carrying respective supplies of first and second laminating materials, said feed rolls being mounted to said cartridge body structure to enable the laminating materials to be unwound from their respective feed rolls, at least one of said laminating materials having a layer of adhesive disposed thereon;

a laminating assembly positioned with respect to said first and second rolls such that the master can be fed into said laminating assembly with said first and second laminating materials being unwound from their respective feed rolls and disposed on opposing sides of the master;

said laminating assembly being constricted and arranged to perform a laminating operation wherein said laminating assembly causes adhesive bonding between the first and second laminating materials and the master being fed therein and then subsequently discharges the laminated master; and an actuator constructed and arranged to affect operation of said laminating assembly so as to perform said laminating, operation;

said cartridge body structure being configured such that the user can remove said removable cartridge from said frame to enable replacement of said removable cartridge when desired.

56. An apparatus according to claim 55, wherein said cartridge body structure has a master feeding opening which is positioned and configured to allow the master to be inserted through said opening between said feed rolls with said first and second laminating materials being unwound from their respective feed rolls disposed on the opposing sides of the master and then into said laminating assembly for performance of said laminating operation.

57. An apparatus according to claim 55, wherein adhesive layer is formed from pressure-sensitive adhesive and wherein said laminating assembly is constructed and arranged to perform the laminating operation without the use of heat transfer by applying pressure to said laminating materials and the master fed therein.

58. An apparatus according to claim 55, wherein said adhesive layer is formed from pressure-sensitive adhesive and wherein said laminating assembly includes first and second cooperating structures which are constructed and arranged to apply pressure to the master and laminating materials fed therein so as to cause said adhesive bonding and perform said laminating operation without the use of heat transfer.

59. An apparatus according to claim 57, wherein said first and second cooperating structures are first and second nip rollers constructed and arranged to apply pressure to said laminating materials as a result of said actuator being operated.

60. An apparatus according to claim 59, wherein said first and second nip rollers are rotatably mounted to said frame.

61. An apparatus according to claim 56, further comprising a feed tray mounted to said frame, said feed tray being constructed and arranged to support and guide the master as it is being fed towards said laminating assembly.

62. An apparatus according to claim 55, further comprising a blade constructed and arranged to sever the processed master and laminating materials.

63. An apparatus according to claim 62, wherein said blade is constructed and arranged to sever the processed master and laminating materials transversely with respect to the direction in which they are fed.

64. A laminating apparatus for performing a laminating operation on a master in conjunction with a removable cartridge comprising a cartridge body structure and first and second feed rolls carrying respective supplies of first and second laminating materials, the feed rolls being mounted to said cartridge body structure to enable the laminating materials to be unwound from their respective feed rolls, at least one of the laminating materials having a layer of adhesive disposed thereon, said apparatus comprising:

a frame constructed and arranged such that the removable cartridge can be removably mounted thereto;

a laminating assembly positioned with respect to said frame such that, when the removable cartridge is removably mounted to said frame, the master can be fed into said laminating assembly with said first and second stock materials being unwound from their respective feed rolls and disposed on opposing sides of the master;

said laminating assembly being constructed and arranged to perform a laminating operation wherein said laminating assembly causes adhesive bonding between the first and second stock materials and the master being fed into said laminating assembly and then subsequently discharges the laminated master; and an actuator constricted and arranged to affect operation of said cooperating structures so as to perform said laminating operation.

65. An apparatus according to claim 64, wherein said laminating assembly is constructed and arranged to perform the laminating operation without the use of heat transfer by applying pressure to said laminating materials and the master fed therein.

66. An apparatus according to claim 64, wherein said laminating assembly includes first and second cooperating structures which are constructed and arranged to apply pressure to the master and laminating materials fed therein so as to cause said adhesive bonding and perform said laminating operation without the use of heat transfer.

67. An apparatus according to claim 66, wherein said first and second cooperating structures are first and second nip rollers constructed and arranged to apply pressure to said laminating materials as a result of said actuator being operated.

68. An apparatus according to claim 64, further comprising a feed tray mounted to said frame, said feed tray being constructed and arranged to support and guide the master as it is being fed towards said laminating assembly.

69. An apparatus according to claim 64, further comprising a blade constructed and arranged to sever the processed master and laminating materials.

70. An apparatus according to claim 69, wherein said blade is constructed and arranged to sever the processed master and laminating materials transversely with respect to the direction in which they are fed.

71. A removable cartridge to be used in conjunction with a laminating apparatus for performing a laminating operation on a master, the apparatus comprising a frame, a laminating assembly constructed and arranged to perform a laminating operation wherein said laminating assembly causes adhesive bonding between substrates fed therein, and an actuator constructed and arranged to affect operation of the laminating assembly, said cartridge comprising:

a cartridge body structure constructed and arranged to be removably mounted to the apparatus frame;

first and second feed rolls each carrying supplies of first and second laminating materials and being mounted to said cartridge body structure to enable the laminating materials to be unwound from their respective feed rolls, at least one of said laminating materials having a layer of adhesive disposed thereon;

said cartridge body structure and said first and second feed rolls being constructed and arranged such that, when said cartridge body structure is removably mounted to the apparatus frame, the master can be fed into the laminating assembly of the apparatus with the laminating materials being unwound from their respective feed rolls and disposed on opposing sides of the master, thereby enabling the actuator to be operated to cause the laminating assembly to perform the aforesaid laminating operation wherein the laminating assembly causes adhesive bonding between said first and second laminating materials and the master being fed therein and then subsequently discharges the laminated master;

said cartridge body structure being constructed and arranged such that, when said cartridge is removably mounted to the frame of the apparatus, said cartridge can be removed from the apparatus frame to enable cartridge replacement when desired.

72. A removable cartridge according to claim 71, wherein said cartridge body structure has a master feeding opening which is positioned and configured with respect to said feed rolls such that the master is inserted through said opening and between said feed rolls before being inserted into the laminating assembly.

73. A removable cartridge according to claim 71, wherein both said first and second laminating materials are transparent substrates with layers of adhesive disposed on each.

74. A removable cartridge according to claim 73, wherein the layers disposed on each transparent substrate are formed from a pressure-sensitive adhesive.

75. A method for performing an adhesive transfer operation wherein adhesive is transferred to a master, said method comprising:
   providing a removable cartridge comprising:
      (i) a cartridge body structure, and
      (ii) first and second feed rolls one of which carries a release liner having a layer of adhesive disposed thereon and the other of which carries a substrate having an affinity for bonding with said adhesive, said feed rolls being mounted to said cartridge body structure to enable the release liner and the substrate with bonding affinity to be unwound from their respective feed rolls;
   removably mounting said cartridge to an apparatus comprising a frame, an actuator, and an adhesive transfer assembly;
   then inserting the master into said adhesive transfer assembly with said release liner and said substrate with bonding affinity being unwound from their respective feed rolls and disposed on opposing sides of said master; and
   thereafter operating said actuator so as to cause said adhesive transfer assembly to perform an adhesive transfer operation wherein said adhesive is bonded with one side of said master and portions of said substrate which extend around the periphery of said master and then said master, release liner, and substrate with bonding affinity are discharged from the apparatus, thereby enabling the substrate to be moved away from said release liner and master with said adhesive remaining bonded to said portions which extended around the periphery of the master.

76. A method according to claim 75, wherein said adhesive is pressure-sensitive adhesive disposed thereon and wherein said adhesive transfer assembly has first and second cooperating structures constructed and arranged to apply pressure to said master, said release liner, and said substrate so as to cause said adhesive bonding without the use of heat transfer.

77. A method according to claim 76, wherein said first and second cooperating structures are first and second nip rollers rotatably mounted to said frame.

78. A method according to claim 76, wherein said actuator is a rotatable crank handle operatively connected to said nip rollers and wherein manually rotating said crank handle manually affects rotation of said nip rollers.

79. An apparatus for processing a master, said apparatus comprising:
   a frame;
   a removable cartridge removably mounted to said frame, said removable cartridge comprising a cartridge body structure and first and second feed rolls carrying respective supplies of first and second stock material, said feed rolls being mounted to said cartridge body structure to enable the stock materials to be unwound from their respective feed rolls, at least one of said stock materials having a layer of adhesive disposed thereon; and
   a master processing assembly positioned with respect to said first and second feed rolls such that the master can be fed into said processing assembly with said first and second stock materials being unwound from their respective feed rolls and disposed on opposing sides of the master;
   said master processing assembly being constructed and arranged to perform a master processing operation wherein said processing assembly causes said adhesive to bond to at least the master during advancement of the master and said stock materials through said master processing assembly;
   said cartridge body structure being configured such that the user can remove said removable cartridge from said frame to enable replacement of said removable cartridge when desired.

80. An apparatus for processing a master in conjunction with a removable cartridge comprising a cartridge body structure and first and second feed rolls carrying respective supplies of first and second stock material, said first and second feed rolls being mounted to said cartridge body structure to enable the stock materials to be unwound from their respective feed rolls, at least one of the stock materials having a layer of adhesive disposed thereon, said apparatus comprising:
   a frame constructed and arranged such that the removable cartridge can be removably mounted thereto; and
   a master processing assembly positioned with respect to said frame such that, when the removable cartridge is removably mounted to said frame, the master can be fed into said master processing assembly with said first and second stock materials unwound from their respective feed rolls and disposed on opposing sides of the master;
   said master processing assembly being constructed and arranged to perform a master processing operation wherein said processing assembly causes said adhesive to bond to at least the master during advancement of the master and said stock materials through said processing assembly.

81. A removable cartridge to be used in conjunction with a master processing apparatus for processing a master, the apparatus comprising a frame, and a master processing assembly constructed and arranged to perform a master processing operation wherein said processing assembly causes adhesive bonding between substrates advanced therethrough, said cartridge comprising:
   a cartridge body structure constructed and arranged to be removably mounted to the apparatus frame;
   first and second feed rolls each carrying supplies of first and second stock materials and being mounted to said cartridge body structure to enable the stock materials to be unwound from their respective feed rolls, at least one of said stock materials having a layer of adhesive disposed thereon;
   said cartridge body structure and said first and second feed rolls being constructed and arranged such that, when said cartridge body structure is removably mounted to the apparatus frame, the master can be inserted into the master processing assembly of the apparatus with said first and second stock materials being unwound from their respective feed rolls and disposed on opposing sides of the master, thereby enabling the master and said stock materials to be advanced through said master processing assembly with said master processing assembly performing the aforesaid master processing operation to cause said adhesive to bond to at least the master;

said cartridge body structure being constructed and arranged such that, when said cartridge is removably mounted to the frame of the apparatus, said cartridge can be removed from the apparatus frame to enable cartridge replacement when desired.

82. A laminating and adhesive transfer apparatus for performing a laminating or adhesive transfer operation, said apparatus comprising:

a frame constructed and arranged such that the removable cartridge can be removably mounted thereto;

a removable cartridge removably mounted to said frame, said cartridge comprising a cartridge body structure and first and second feed rolls carrying respective supplies of first and second stock material, the feed rolls being mounted to said cartridge body structure to enable the stock materials to be unwound from their respective feed rolls, at least one of the stock materials having a layer of adhesive disposed thereon, a master processing assembly positioned with respect to said frame such that, when the removable cartridge is removably mounted to said frame, the master can be fed into said master processing assembly with said first and second stock materials being unwound from said feed rolls and disposed on the opposing sides of the master;

said master processing assembly being constructed and arranged to perform a laminating or adhesive transfer operation wherein said processing assembly causes said adhesive to bond to at least the master during advancement of the master and stock materials through said master processing assembly.

83. A laminating and adhesive transfer apparatus for performing a laminating or adhesive transfer operation on a master in conjunction with a removable cartridge comprising a cartridge body structure and first and second feed rolls carrying respective supplies of first and second stock material, the feed rolls being mounted to said cartridge body structure to enable the stock materials to be unwound from their respective feed rolls, at least one of the stock materials having a layer of adhesive disposed thereon, said apparatus comprising:

a frame constructed and arranged such that the removable cartridge can be removably mounted thereto; and a master processing assembly positioned with respect to said frame such that, when the removable cartridge is removably mounted to said frame, the master can be fed into said master processing assembly with said first and second stock materials being unwound from said feed rolls and disposed on the opposing sides of the master;

said master processing assembly being constructed and arranged to perform a laminating or adhesive transfer operation wherein said processing assembly said adhesive to bond to at least the master during advancement of the master and stock materials through said master processing assembly.

84. A removable cartridge to be used in conjunction with a laminating and adhesive transfer apparatus for performing a laminating or adhesive transfer operation on a master, the apparatus comprising a frame, and a master processing assembly constricted and arranged to perform the laminating or adhesive transfer operation wherein said processing assembly causes adhesive bonding between substrates advanced therethrough, said cartridge comprising:

a cartridge body structure constructed and arranged to be removably mounted to the apparatus frame;

first and second feed rolls each carrying supplies of first and second stock materials and being mounted to said cartridge body structure to enable the stock materials to be unwound from their respective feed rolls, at least one of said stock materials having a layer of adhesive disposed thereon;

said cartridge body structure and said first and second feed rolls being constructed and arranged such that, when said cartridge body structure is removably mounted to the apparatus frame, the master can be inserted into the master processing assembly of the apparatus with said stock materials being unwound from their respective feed rolls and disposed on opposing sides of the master, thereby enabling the master and said stock materials to be advanced through said master processing assembly with said master processing assembly performing the aforesaid laminating or adhesive transfer operation to cause said adhesive to bond to at least the master;

said cartridge body structure being constructed and arranged such that, when said cartridge is removably mounted to the frame of the apparatus, said cartridge can be removed from the apparatus frame to enable cartridge replacement when desired.

85. A laminating apparatus for performing,g a laminating operation on a master, said apparatus comprising:

a frame;

a removable cartridge removably mounted to said frame, said removable cartridge comprising a cartridge body structure and first and second feed rolls carrying respective supplies of first and second laminating materials, said feed rolls being mounted to said cartridge body structure to enable the laminating materials to be unwound from their respective feed rolls, at least one of said laminating materials having a layer of adhesive disposed thereon; and a laminating assembly positioned with respect to said first and second rolls such that the master can be fed into said laminating assembly with said first and second laminating materials being unwound from their respective feed rolls and disposed on opposing sides of the master;

said laminating assembly being constructed and arranged to perform a laminating operation wherein said laminating assembly causes said adhesive to bond the first and second laminating materials and the master during advancement thereof through said laminating assembly;

said cartridge body structure being configured such that the user can remove said removable cartridge from said frame to enable replacement of said removable cartridge when desired.

86. A laminating apparatus for performing a laminating operation on a master in conjunction with a removable cartridge comprising a cartridge body structure and first and second feed rolls carrying respective supplies of first and second laminating material, the feed rolls being mounted to said cartridge body structure to enable the laminating materials to be unwound from their respective feed rolls, at least one of the laminating materials having a layer of adhesive disposed thereon, said apparatus comprising:

a frame constructed and arranged such that the removable cartridge can be removably mounted thereto; and a laminating assembly positioned with respect to said frame such that, when the removable cartridge is removably mounted to said frame, the master can be fed into said laminating assembly with said first and second laminating materials being unwound from their respective feed rolls and disposed on opposing sides of the master;

said laminating assembly being constructed and arranged to perform a laminating operation wherein said laminating assembly causes said adhesive to bond the first and second laminating materials and the master during advancement thereof through said laminating assembly.

87. A removable cartridge to be used in conjunction with a laminating apparatus for performing a laminating operation on a master, the apparatus comprising a frame, and a laminating assembly constructed and arranged to perform a laminating operation wherein said laminating assembly causes adhesive bonding between substrates advanced therethrough, said cartridge comprising:

a cartridge body stricture constructed and arranged to be removably mounted to the apparatus frame;

first and second feed rolls each carrying supplies of first and second laminating materials and being mounted to said cartridge body structure to enable the laminating materials to be unwound from their respective feed rolls, at least one of said laminating materials having a layer of adhesive disposed thereon;

said cartridge body structure and said first and second feed rolls being constructed and arranged such that, when said cartridge body structure is removably mounted to the apparatus frame, the master can be fed into the laminating assembly of the apparatus with the laminating materials being unwound from their respective feed rolls and disposed on opposing sides of the master, thereby enabling the master and said laminating materials to be advanced through said laminating assembly with said laminating assembly performing the aforesaid laminating operation to cause said adhesive to bond said first and second laminating materials and the master;

said cartridge body structure being constructed and arranged such that, when said cartridge is removably mounted to the frame of the apparatus, said cartridge can be removed from the apparatus frame to enable cartridge replacement when desired.

88. An adhesive transfer apparatus for performing an adhesive transfer operation on a master, said apparatus comprising:

a frame;

a removable cartridge removably mounted to said frame, said removable cartridge comprising a cartridge body structure and first and second feed rolls carrying respective supplies of first and second stock material, said feed rolls being mounted to said cartridge body structure to enable the stock materials to be unwound from their respective feed rolls, at least one of said stock materials having a layer of adhesive disposed thereon; and an adhesive transfer assembly positioned with respect to said first and second rolls such that the master can be fed into said adhesive transfer assembly with said first and second stock materials being unwound from their respective feed rolls and disposed on opposing sides of the master;

said adhesive transfer assembly being constructed and arranged to perform an adhesive transfer operation wherein said adhesive transfer assembly causes said adhesive to bond to at least the master during advancement of the master and stock materials through said adhesive transfer assembly;

said cartridge body structure being configured such that the user can remove said removable cartridge from said frame to enable replacement of said removable cartridge when desired.

89. An adhesive transfer apparatus for performing an adhesive transfer operation on a master in conjunction with a removable cartridge comprising a cartridge body structure and first and second feed rolls carrying respective supplies of first and second stock material, the feed rolls being mounted to said cartridge body structure to enable the stock materials to be unwound from their respective feed rolls, at least one of the stock materials having a layer of adhesive disposed thereon, said apparatus comprising:

a frame constructed and arranged such that the removable cartridge can be removably mounted thereto; and an adhesive transfer assembly positioned with respect to said frame such that, when the removable cartridge is removably mounted to said frame, the master can be fed into said adhesive transfer assembly with said first and second stock materials being unwound from their respective feed rolls and disposed on opposing sides of the master;

said adhesive transfer assembly being constructed and arranged to perform an adhesive transfer operation wherein said adhesive transfer assembly causes said adhesive to bond to at least the master during advancement of the master and stock materials through said adhesive transfer assembly.

90. A removable cartridge to be used in conjunction with an adhesive transfer apparatus for performing an adhesive transfer operation on a master, the apparatus comprising a frame, and an adhesive transfer assembly constructed and arranged to perform an adhesive transfer operation wherein said adhesive transfer assembly causes adhesive bonding between substrates advanced therethrough, said cartridge comprising:

a cartridge body structure constructed and arranged to be removably mounted to the apparatus frame;

first and second feed rolls each carrying supplies of first and second stock materials and being mounted to said cartridge body structure to enable the stock materials to be unwound from their respective feed rolls, at least one of said stock materials having a layer of adhesive disposed thereon;

said cartridge body stricture and said first and second feed rolls being constricted and arranged such that, when said cartridge body structure is removably mounted to the apparatus frame, the master can be fed into the adhesive transfer assembly of the apparatus with the adhesive transfer materials being, unwound from their respective feed rolls and disposed on opposing sides of the master, thereby enabling the master and said stock materials to be advanced through said adhesive transfer assembly with said adhesive transfer assembly performing the aforesaid adhesive transfer operation to cause said adhesive to bond to at least the master;

said cartridge body structure being constructed and arranged such that, when said cartridge is removably mounted to the frame of the apparatus, said cartridge can be removed from the apparatus frame to enable cartridge replacement when desired.

91. A method for performing a master processing operation, said method comprising:

providing a removable cartridge comprising:
(i) a cartridge body structure, and
(ii) first and second feed rolls each carrying a supply of stock material and being mounted to said cartridge body structure to enable the stock materials to be unwound from their respective feed rolls, at least one of said laminating materials having a layer of adhesive disposed thereon;

removably mounting said cartridge to an apparatus comprising a frame and a master processing assembly;

then advancing the master into said master processing assembly with said stock materials being unwound from their respective feed rolls and disposed on opposing sides of said master so as to cause said master assembly to cause said adhesive to bond to at least said master.

92. An apparatus for processing a master, said apparatus comprising:

a frame;

a removable cartridge removably mounted to said frame, said removable cartridge comprising a cartridge body structure and first and second feed rolls carrying respective supplies of first and second stock material, said feed rolls being mounted to said cartridge body structure to enable the stock materials to be unwound from their respective feed rolls, at least one of said stock materials having a layer of adhesive disposed thereon;

a first rotatable nip roller;

a second rotatable nip roller positioned adjacent said first nip roller, said first and second nip rollers being positioned such that the master can be fed between said nip rollers with said first and second stock materials unwound from their respective feed rolls and disposed on opposing sides of the master; and an actuator operatively connected to said nip rollers, said actuator being constructed and arranged to affect rotation of said nip rollers;

said nip rollers being constructed and arranged such that during rotation thereof said nip rollers apply pressure to said master and stock materials fed therebetween to affect adhesive bonding between the master and the stock materials and then subsequently discharge the processed master and stock materials;

said cartridge body structure being configured such that the user can remove said cartridge from said frame to enable replacement of said cartridge when desired.

93. An apparatus according to claim 92, wherein said actuator is manually powered.

94. An apparatus according to claim 92, wherein said adhesive is pressure-sensitive adhesive.

95. An apparatus according to claim 92, wherein said feed rolls are slidably mounted to said cartridge body structure.

96. An apparatus according to claim 92, wherein said first and second feed rolls each have pre-tensioning structure constructed and arranged to create a pre-tensioning resistance to rotation of said feed rolls.

97. An apparatus for processing a master in conjunction with a removable cartridge comprising a cartridge body structure and first and second feed rolls carrying, respective supplies of first and second stock material, said first and second feed rolls being mounted to said cartridge body structure to enable the stock materials to be unwound from their respective feed rolls, at least one of the stock materials having a layer of adhesive disposed thereon, said apparatus comprising:

a frame constructed and arranged such that the removable cartridge can be removably mounted thereto;

a first rotatable nip roller rotatably mounted to said frame;

a second rotatable nip roller rotatably mounted to said frame adjacent said first nip roller, said first and second nip rollers being positioned such that, when said cartridge is removably mounted to said frame, the master can be fed between said nip rollers with said first and second stock materials unwound from their respective feed rolls and disposed on opposing sides of the master;

an actuator operatively connected to said nip rollers, said actuator being constructed and arranged to affect rotation of said nip rollers;

said nip rollers being constructed and arranged such that, during rotation thereof, said nip rollers apply pressure to said master and stock materials fed therebetween to affect adhesive bonding between the master and stock materials and then subsequently discharge the processed master and stock materials;

said cartridge body structure being configured such that the user can remove said cartridge from said frame to enable replacement of said cartridge when desired.

98. An apparatus according to claim 95, wherein said actuator is manually powered.

99. An apparatus according to claim 6, wherein said feed rolls are slidably mounted to said cartridge body structure.

100. An apparatus according to claim 6, wherein said first and second feed rolls each have pre-tensioning structure constructed and arranged to create a pre-tensioning resistance to rotation of said feed rolls.

101. A cartridge according to claim 25, wherein said feed rolls are slidably mounted to said cartridge body structure.

102. A cartridge according to claim 25, wherein said first and second feed rolls each have pre-tensioning structure constructed and arranged to create a pre-tensioning resistance to rotation of said feed rolls.

103. An apparatus according to claim 31, wherein said feed rolls are slidably mounted to said cartridge body structure.

104. An apparatus according to claim 31, wherein said first and second iced rolls each have pre-tensioning structure constructed and arranged to create a pre-tensioning resistance to rotation of said feed rolls.

105. A cartridge according to claim 49, wherein said feed rolls are slidably mounted to said cartridge body structure.

106. A cartridge according to claim 49, wherein said first and second feed rolls each have pre-tensioning structure constructed and arranged to create a pre-tensioning resistance to rotation of said feed rolls.

107. An apparatus according to claim 55, wherein said feed rolls are slidably mounted to said cartridge body structure.

108. An apparatus according to claim 55, wherein said first and second feed rolls each have pre-tensioning structure constructed and arranged to create a pre-tensioning resistance to rotation of said feed rolls.

109. A cartridge according to claim 71, wherein said feed rolls are slidably mounted to said cartridge body structure.

110. A cartridge according to claim 71, wherein said first and second feed rolls each have pre-tensioning structure constructed and arranged to create a pre-tensioning resistance to rotation of said feed rolls.

111. An apparatus according to claim 79, wherein said feed rolls are slidably mounted to said cartridge body structure.

112. An apparatus according to claim 79, wherein said first and second feed rolls each have pre-tensioning structure constructed and arranged to create a pre-tensioning resistance to rotation of said feed rolls.

113. A cartridge according to claim 81, wherein said feed rolls are slidably mounted to said cartridge body structure.

114. A cartridge according to claim 81, wherein said first and second feed rolls each have pre-tensioning structure constructed and arranged to create a pre-tensioning resistance to rotation of said feed rolls.

115. An apparatus according to claim 82, wherein said feed rolls are slidably mounted to said cartridge body structure.

116. An apparatus according to claim 82, wherein said first and second feed rolls each have pre-tensioning structure constructed and arranged to create a pre-tensioning resistance to rotation of said feed rolls.

117. A cartridge according to claim 84, wherein said feed rolls are slidably mounted to said cartridge body structure.

118. A cartridge according to claim 84, wherein said first and second feed rolls each have pre-tensioning structure constructed and arranged to create a pre tensioning resistance to rotation of said feed rolls.

119. An apparatus according to claim 85, wherein said feed rolls are slidably mounted to said cartridge body structure.

120. An apparatus according to claim 85, wherein said first and second feed rolls each have pre-tensioning structure constructed and arranged to create a pre-tensioning resistance to rotation of said feed rolls.

121. A cartridge according to claim 87, wherein said feed rolls are slidably mounted to said cartridge body structure.

122. A cartridge according to claim 87, wherein said first and second feed rolls each have pre-tensioning structure constructed and arranged to create a pre-tensioning resistance to rotation of said feed rolls.

123. An apparatus according to claim 88, wherein said feed rolls are slidably mounted to said cartridge body structure.

124. An apparatus according to claim 88, wherein said first and second feed rolls each have pre-tensioning structure constructed and arranged to create a pre-tensioning resistance to rotation of said feed rolls.

125. A cartridge according to claim 90, wherein said feed rolls are slidably mounted to said cartridge body structure.

126. A cartridge according to claim 90, wherein said first and second feed rolls each have pre-tensioning structure constructed and arranged to create a pre-tensioning resistance to rotation of said feed rolls.

127. A method according to claim 1, wherein providing said cartridge includes slidably mounting said feed rolls to said cartridge body structure.

128. A method according to claim 75, wherein providing said cartridge includes slidably mounting said feed rolls to said cartridge body structure.

129. A method according to claim 91, wherein providing said cartridge includes slidably mounting said feed rolls to said cartridge body structure.

\* \* \* \* \*

UNITED STATES PATENT AND TRADEMARK OFFICE
CERTIFICATE OF CORRECTION

PATENT NO. : 6,270,612 B1
DATED : August 7, 2001
INVENTOR(S) : Franklin C. Bradshaw It is certified that error appears in the above-identified patent and that said Letters Patent is hereby corrected as shown below:

Column 2,
Line 66, change "Tile" to -- The --.

Column 3,
Line 67, change "self-clearing" to -- self-cleaning --.

Column 4,
Line 1, change "self-clearing" to -- self-cleaning --.
Line 20, change "Lo" to -- to --; and
Line 55, change "Mill" to -- will --.

Column 5,
Line 32, change "mean s" to -- means --; and
Line 33, change "Fears" to -- gears --.

Column 6,
Line 25, change "and" to -- an --.

Column 9,
Line 64, after "processing", delete ",".

Column 11,
Line 25, change "aligned" to -- arranged --.

Column 12,
Line 62, change "constricted" to -- constructed --.

Column 13,
Line 3, after "laminating", delete ",".

Column 18,
Line 33, change "performing,g" to -- performing --.

Column 19,
Line 26, change "stricture" to -- structure --.

UNITED STATES PATENT AND TRADEMARK OFFICE
CERTIFICATE OF CORRECTION

PATENT NO. : 6,270,612 B1
DATED : August 7, 2001
INVENTOR(S) : Franklin C. Bradshaw It is certified that error appears in the above-identified patent and that said Letters Patent is hereby corrected as shown below:

Column 20,
Line 61, after "being", delete ",".

Signed and Sealed this

Thirtieth Day of April, 2002

Attest:

Attesting Officer

JAMES E. ROGAN
Director of the United States Patent and Trademark Office